(12) United States Patent
Hanaoka et al.

(10) Patent No.: US 11,142,057 B2
(45) Date of Patent: Oct. 12, 2021

(54) DRIVE UNIT

(71) Applicant: HONDA MOTOR CO., LTD., Tokyo (JP)

(72) Inventors: Daisuke Hanaoka, Saitama (JP); Yuichiro Ueno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 16/872,804

(22) Filed: May 12, 2020

(65) Prior Publication Data

US 2020/0361298 A1 Nov. 19, 2020

(30) Foreign Application Priority Data

May 14, 2019 (JP) .............................. JP2019-091648

(51) Int. Cl.
| | | |
|---|---|---|
| *B60K 1/04* | (2019.01) | |
| *B60K 1/00* | (2006.01) | |
| *B60K 26/02* | (2006.01) | |
| *B60R 16/02* | (2006.01) | |
| *B62D 25/08* | (2006.01) | |
| *B60K 6/28* | (2007.10) | |

(52) U.S. Cl.
CPC .................. *B60K 1/00* (2013.01); *B60K 1/04* (2013.01); *B60K 26/02* (2013.01); *B60R 16/0207* (2013.01); *B62D 25/082* (2013.01); *B60K 6/28* (2013.01); *B60Y 2200/91* (2013.01); *B60Y 2200/92* (2013.01)

(58) Field of Classification Search
CPC ...... B60R 16/0207; B60K 26/02; B60K 1/00; B60K 1/04; B62D 25/082
See application file for complete search history.

(56) References Cited

U.S. PATENT DOCUMENTS

| | | | | |
|---|---|---|---|---|
| 5,667,029 A | * | 9/1997 | Urban .................... | B60K 26/02 180/65.23 |
| 6,295,487 B1 | * | 9/2001 | Ono ......................... | B60K 6/44 701/22 |
| 6,595,308 B2 | * | 7/2003 | Bowen ................. | B60K 17/356 180/65.6 |
| 7,270,203 B2 | * | 9/2007 | Hsu ........................ | B60K 6/445 180/65.285 |
| 8,011,461 B2 | * | 9/2011 | Rodriguez .............. | B60L 15/20 180/65.23 |

(Continued)

FOREIGN PATENT DOCUMENTS

WO WO 2012/114491 A1 8/2012

*Primary Examiner* — James A Shriver, II
*Assistant Examiner* — James J Triggs
(74) *Attorney, Agent, or Firm* — Paratus Law Group, PLLC

(57) ABSTRACT

A drive unit includes a drive source, a case which is connected to the drive source and accommodates an electric motor, a control device which is mounted on an upper surface of the case and controls the electric motor, and an auxiliary machine placed on an upper surface of the drive source. The drive source and the control device are connected by a reinforcing member, and the reinforcing member is arranged so as to surround at least a part of the auxiliary machine in a top view. According to the drive unit, the vibration of the control device can be suppressed, and the auxiliary machine is protected while the number of parts is reduced.

6 Claims, 7 Drawing Sheets

(56) References Cited

U.S. PATENT DOCUMENTS

| | | | | |
|---|---|---|---|---|
| 8,731,755 | B2* | 5/2014 | Rauner | B60K 6/52 |
| | | | | 701/22 |
| 9,387,756 | B1* | 7/2016 | Whiting | B60W 10/26 |
| 2009/0201650 | A1* | 8/2009 | Hauser | B60L 15/20 |
| | | | | 361/736 |
| 2010/0044129 | A1* | 2/2010 | Kyle | B60L 50/16 |
| | | | | 180/65.25 |
| 2010/0252339 | A1* | 10/2010 | Bibeau | B60L 50/53 |
| | | | | 180/12 |
| 2014/0106928 | A1* | 4/2014 | Ruger | B60W 10/08 |
| | | | | 477/5 |
| 2018/0106017 | A1* | 4/2018 | Huissoon | E02F 3/308 |

* cited by examiner

DRIVE UNIT

CROSS REFERENCE TO PRIOR APPLICATION

This application claims priority to Japanese Patent Application No. 2019-091648 (filed on May 14, 2019), which is hereby incorporated by reference in its entirety.

TECHNICAL FIELD

The present invention relates to a drive unit used for an electric vehicle or the like.

BACKGROUND ART

In recent years, a drive unit in which a drive source and a transmission case are arranged side by side and a control device for controlling an electric motor is arranged on an upper surface of the transmission case has been known. International Publication No. 2012/114491 describes a power plant for a hybrid vehicle in which an engine and a trans-axle case are arranged side by side and an inverter is arranged on an upper surface of the trans-axle case. In order to suppress the vibration of the inverter due to the vibration of the engine, a stay connects the engine and the inverter.

An auxiliary machine such as a fuel pump may be arranged on an upper surface of a drive source. The upper surface of the drive source may come into contact with a tool at the time of assembling, maintenance, or the like, or may come into contact with other parts at the time of assembling other parts. Therefore, protection of the auxiliary machine is necessary.

SUMMARY OF INVENTION

In such a drive unit in which the auxiliary machine is arranged on the upper surface of the drive source, it is necessary to suppress the vibration of the drive source and protect the auxiliary machine. In this case, a component for suppressing vibration and a component for protecting the auxiliary machine are required, and thus there is a problem that the number of components increases.

An embodiment of the present invention provides a drive unit capable of suppressing vibration of a control device due to vibration of a drive source and protecting an auxiliary machine while suppressing an increase in the number of parts.

An embodiment of the present invention provides a drive unit comprising:
 a drive source,
 a case which is connected to the drive source and accommodates an electric motor,
 a control device which is mounted on an upper surface of the case and controls the electric motor; and
 an auxiliary machine placed on an upper surface of the drive source, wherein
  the drive source and the control device are connected by a reinforcing member, and
  the reinforcing member is arranged so as to surround at least a part of the auxiliary machine in a top view.

According to the embodiment, since the drive source and the control device are connected by the reinforcing member, the vibration of the control device can be suppressed. Further, by disposing the reinforcing member so as to surround at least a part of the auxiliary machine when viewed from above, the reinforcing member can be used as a protection member of the auxiliary machine, and thus the number of parts can be reduced.

DESCRIPTION OF EMBODIMENTS

Hereinafter, an embodiment of a drive unit 1 mounted on an electric vehicle or the like of the present invention will be described with reference to the accompanying drawings.

Figure 1:
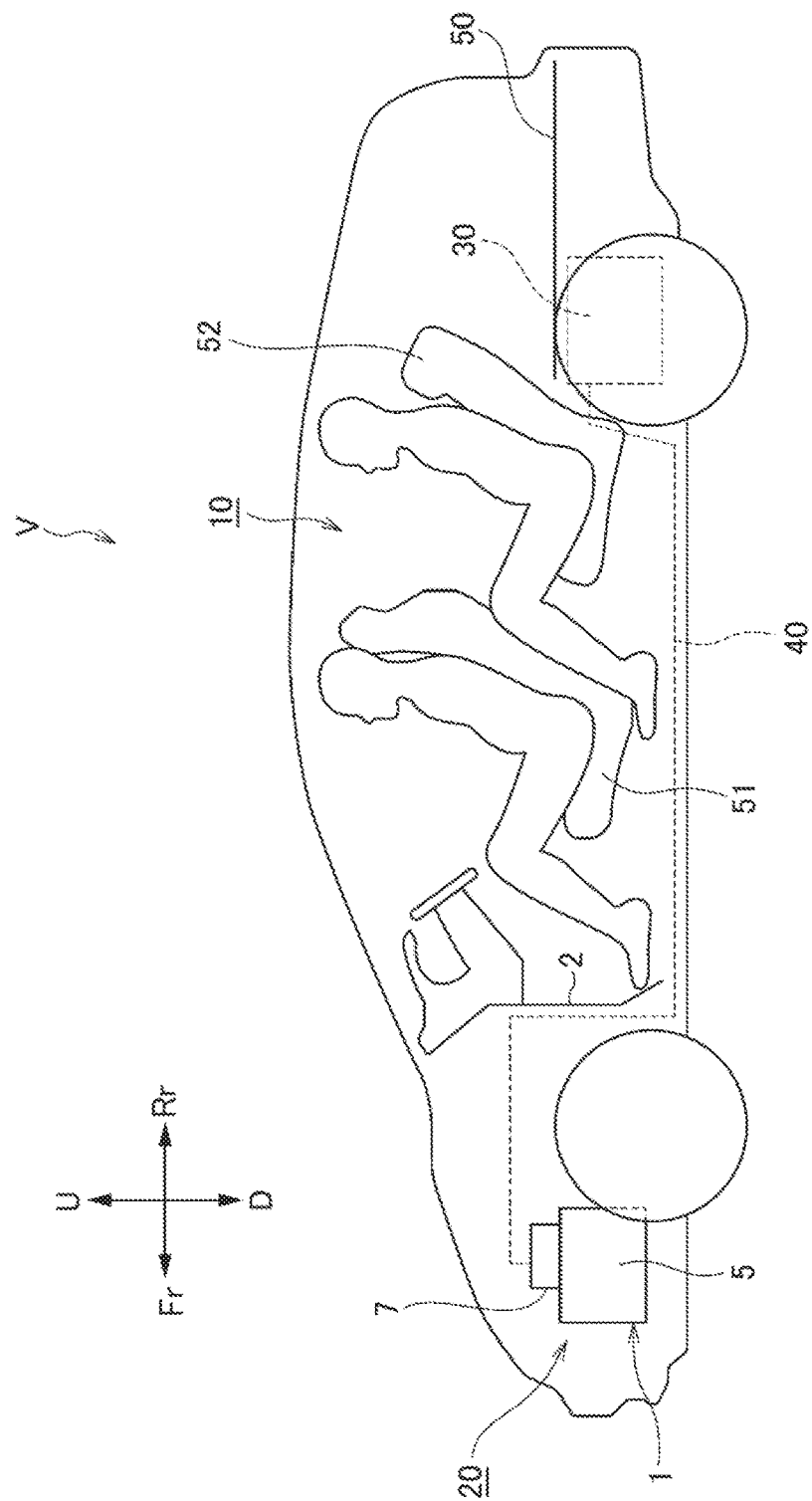
FIG. 1 is a schematic side view illustrating the entire structure of a vehicle equipped with a drive unit according to an embodiment of the present invention.
Figure 2:
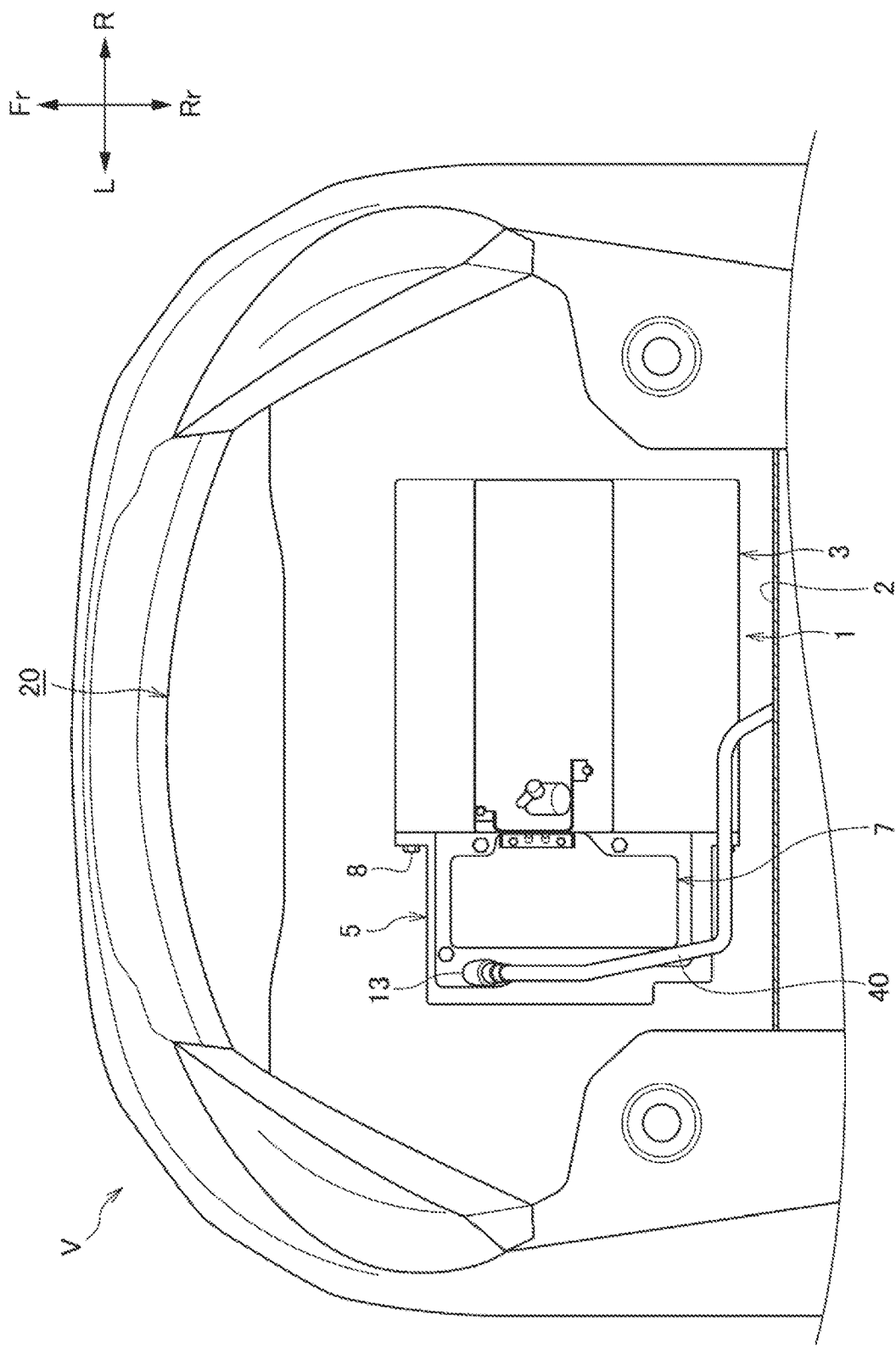
FIG. 2 is a schematic plan view illustrating a motor room of the vehicle illustrated in FIG. 1.

First, a vehicle V on which the drive unit 1 is mounted will be described with reference to FIGS. 1 and 2. In the following description, the front and rear, left and right, and up and down are described according to a direction seen from a driver of the vehicle. In the drawings, the front of the vehicle is indicated by Fr, the rear is Rr, the left is L, the right is R, the upper is U, and the lower is D.

The vehicle V according to the embodiment is defined by a dash panel 2 into a compartment 10 and a motor room 20 in front of the compartment 10. The vehicle compartment 10 is provided with a front seat 51 and a rear seat 52. A battery 30 is provided below a floor panel 50 behind the rear seat 52.

Figure 3:
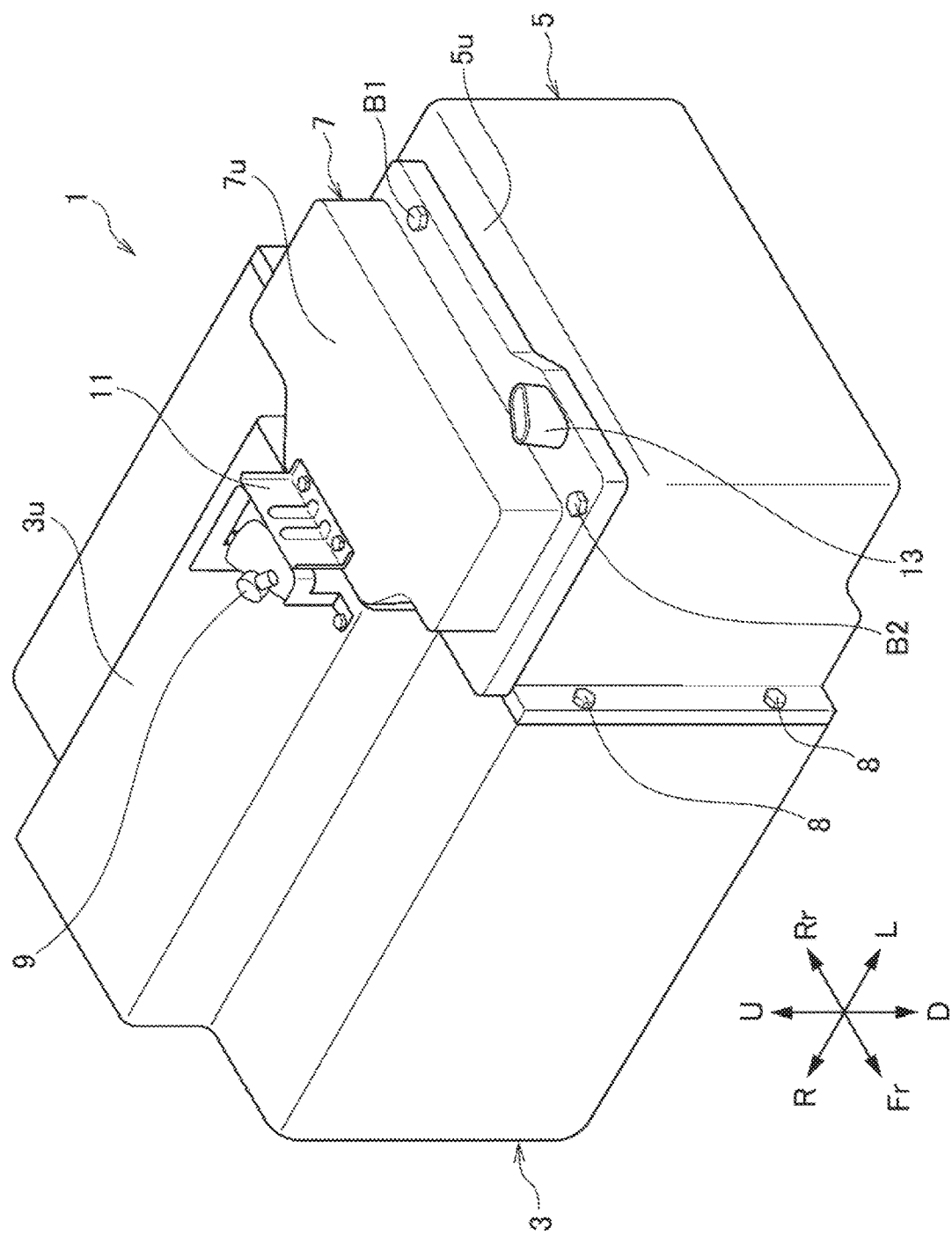
FIG. 3 is a perspective view of the drive unit according to the embodiment of the present invention.

In the motor room 20, the drive unit 1 is arranged. As illustrated in FIGS. 2 and 3, the drive unit 1 includes a drive source 3, a transmission case 5 which is connected to the drive source 3 and accommodates an electric motor 4 and a power transmission unit 6, a control device 7 mounted on an upper surface 5u of the transmission case 5 and controlling the electric motor 4, and an auxiliary machine 9 arranged on an upper surface 3u of the drive source 3. The transmission case 5 is fixed to the drive source 3 by bolts 8 penetrating through a flange portion of the transmission case 5.

The drive source 3 and the transmission case 5 are arranged side by side so that the drive source 3 is located on the right side and the transmission case 5 is located on the left side and the control device 7 is fixed to the upper surface 5u of the transmission case 5. More specifically, referring to FIG. 4, the control device 7 is fixed to the upper surface 5u of the transmission case 5 at first to fourth fastening points B1 to B4. The fastening point means the center of a fastening member such as bolt when viewed from the above. The first fastening point B1 and the second fastening point B2 are located distal to the drive source 3 in a left-right direction and the third fastening point B3 and the fourth fastening point B4 are located close to the drive source 3 in the left-right direction. Further, the third fastening point B3 and the fourth fastening point B4 are located closer to (inside) the auxiliary machine 9 than the first fastening point B1 and the second fastening point B2 in a front-rear direction. The first fastening point B1 and the third fastening point B3 are located rearward with respect to the auxiliary machine 9 and the second fastening point B2 and the fourth fastening point B4 are located forward with respect to the auxiliary machine 9. The control device 7 is provided with a DC line connector 13 at the left front portion and is connected to the battery 30 by the DC line 40 connected to the DC line connector 13 (see also FIG. 1).

The drive source 3 is, for example, an engine.

Figure 5:
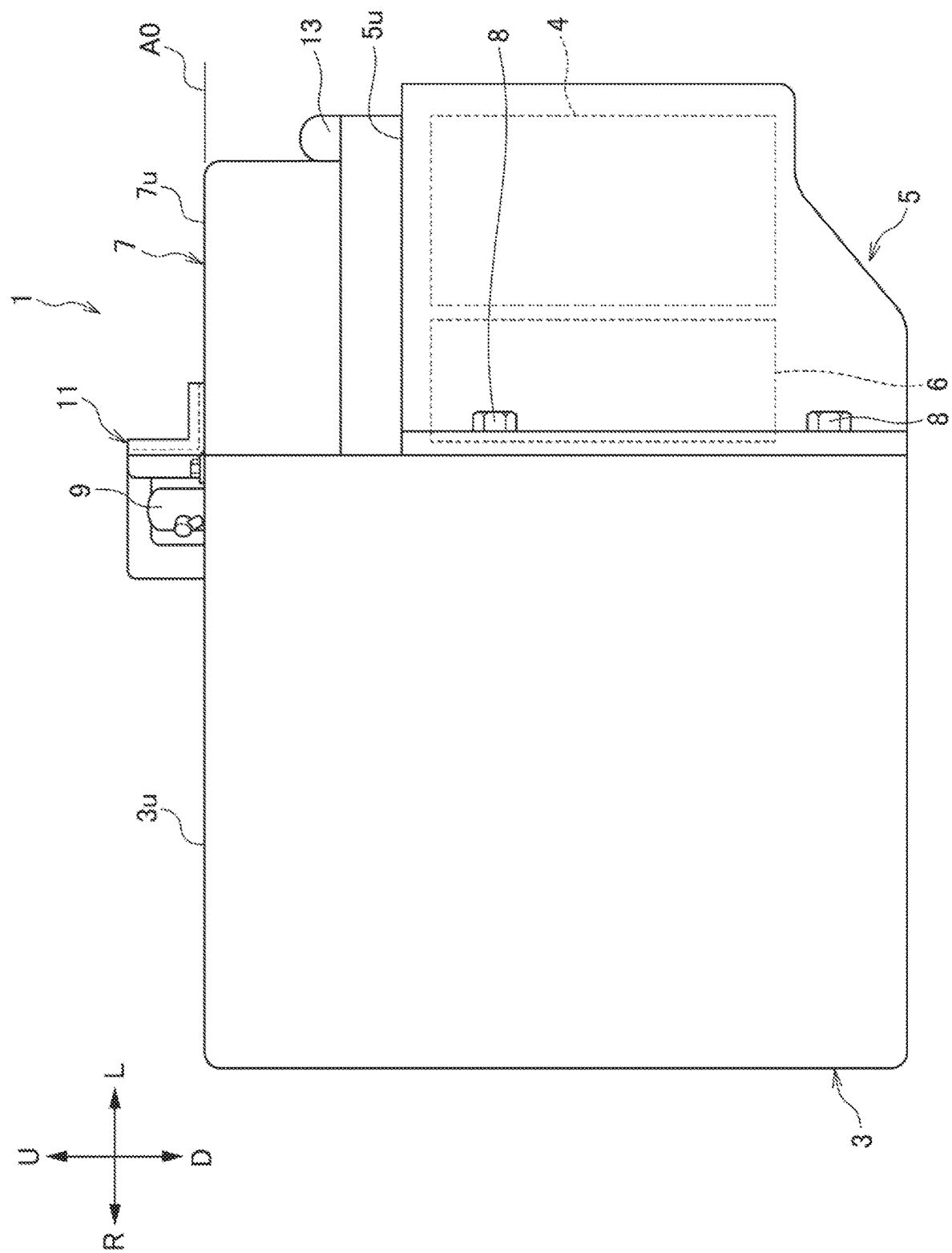
FIG. 5 is a side view of the drive unit of FIG. 3 as viewed from the front.
Figure 6:
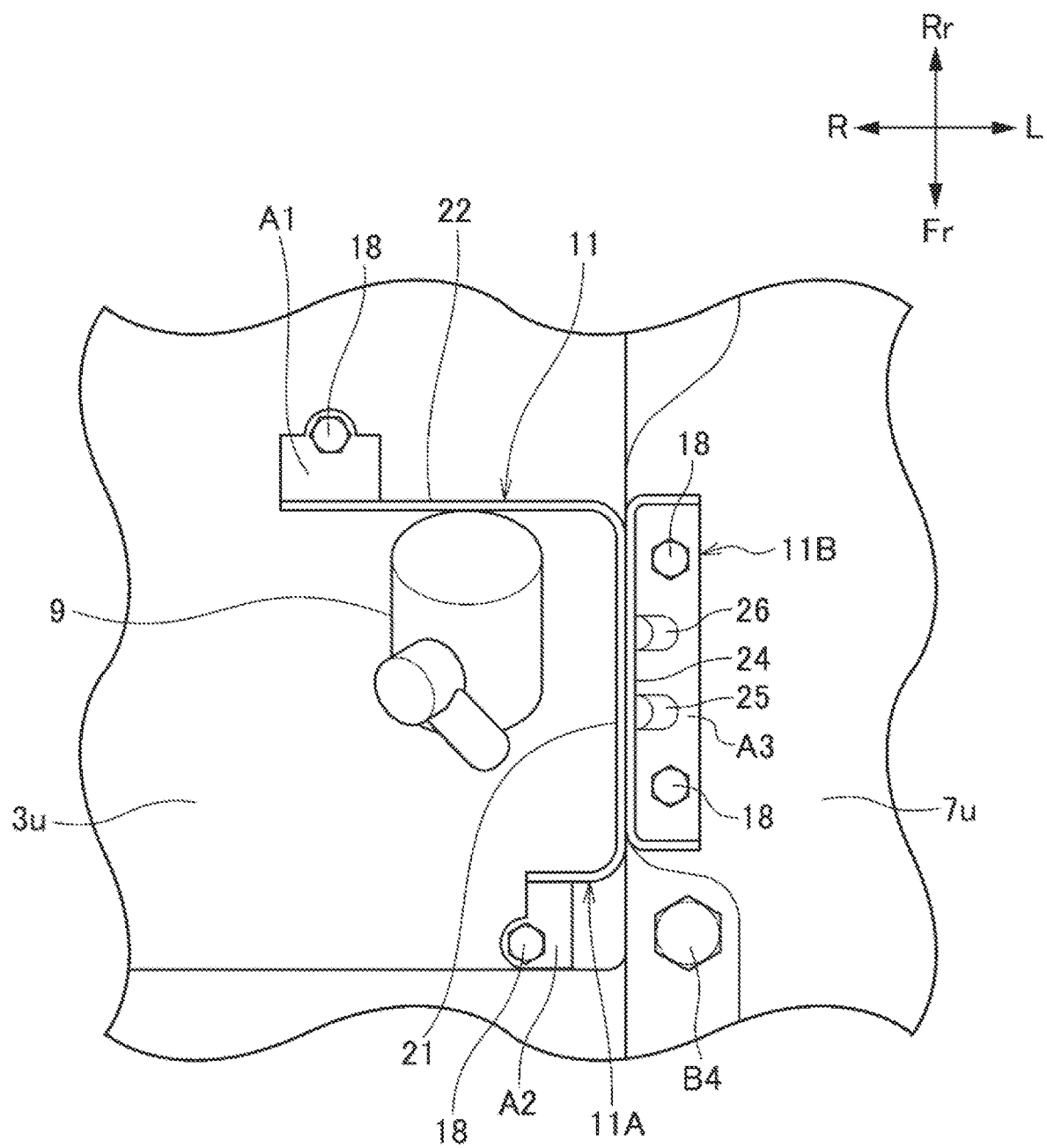
FIG. 6 is a partially enlarged view of FIG. 4.

The transmission case 5 accommodates the electric motor 4 and the power transmission unit 6 as illustrated in FIG. 5. The electric motor 4 generates power and performs driving and the power transmission unit 6 transmits the power of the drive source 3 and the electric motor 4 to wheels.

The control device 7 is, for example, a Power Control Unit (PCU) and is a control device used for a power supply circuit of a hybrid vehicle or the like. The control device 7 includes an inverter, a direct current (DC)—direct current (DC) converter, a power control device in which those are integrated, and the like.

The auxiliary machine 9 is, for example, a high-pressure pump for sucking gasoline from a gasoline tank and supplying it to the engine.

The drive source 3 and the control device 7 are connected by a reinforcing member 11 provided on the upper surface of the drive unit 1 and the reinforcing member 11 is disposed so as to surround at least a part of the auxiliary machine 9 when viewed from the above. The top view means a state viewed from above in a height direction.

Figure 4:
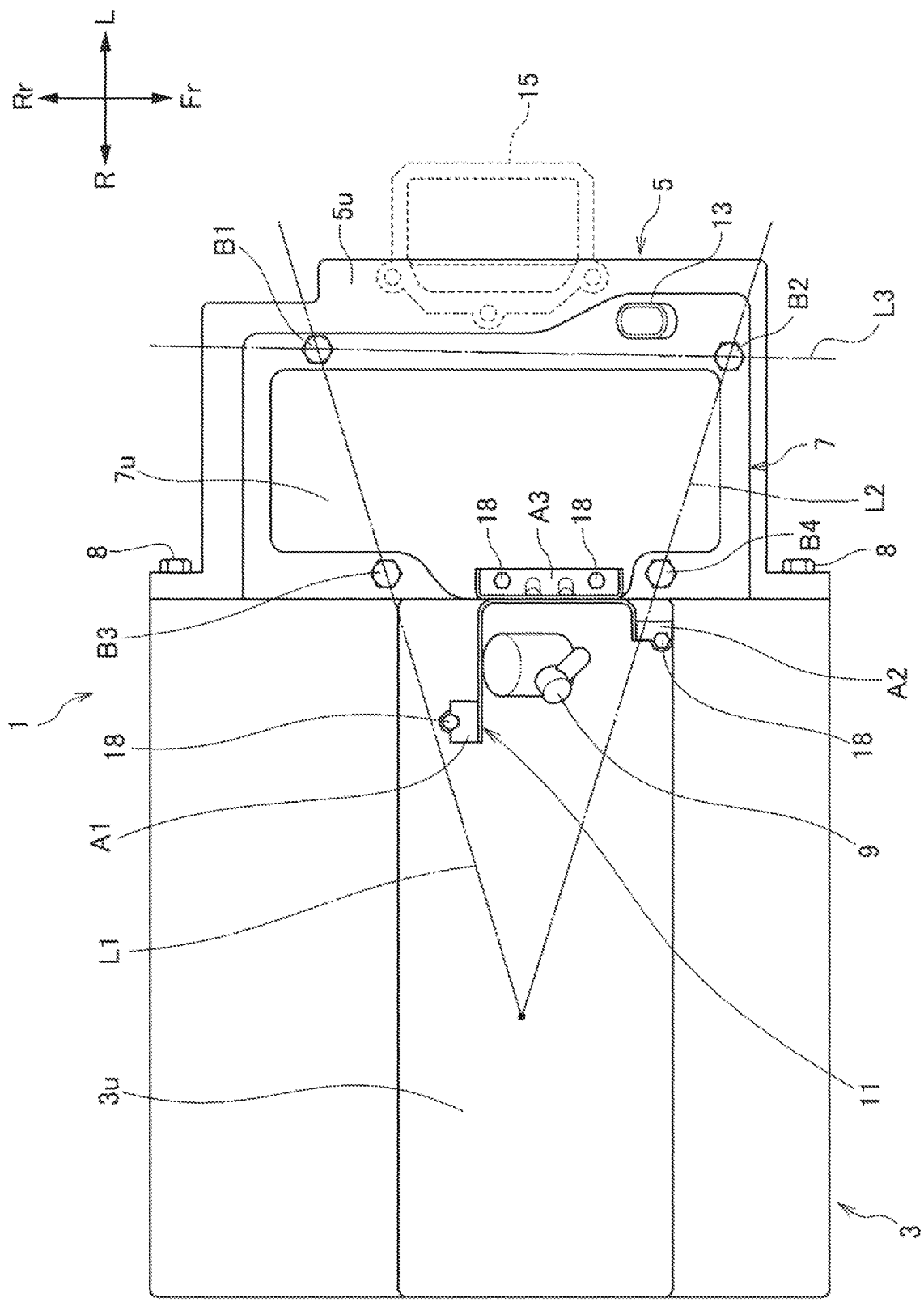
FIG. 4 is a plan view of the drive unit of FIG. 3 as viewed from above.

As illustrated in FIG. 4, the reinforcing member 11 is fixed to an upper surface 3u of the drive source 3 by a first fixed portion A1 and a second fixed portion A2 which are separated from each other in a front-rear direction when viewed from above. Further, in the front-rear direction, the reinforcing member 11 is fixed to an upper surface 7u of the control device 7 by a third fixed portion A3 located between the first fixed portion A1 and the second fixed portion A2.

Figure 7:
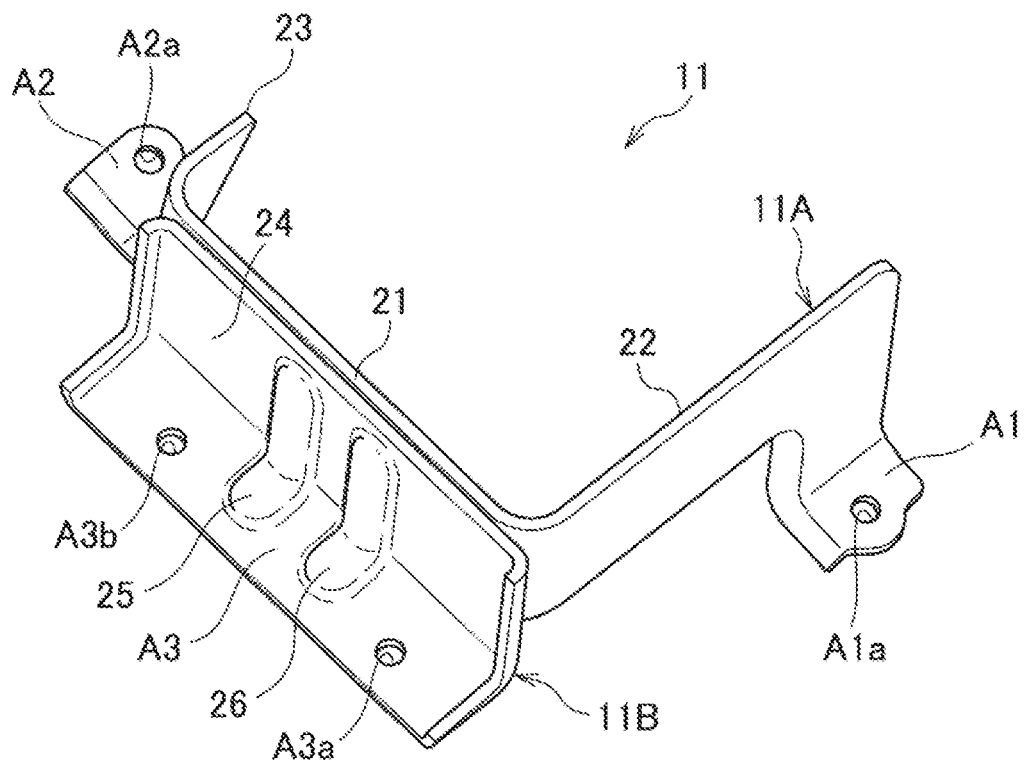
FIG. 7 is a perspective view of a reinforcing member.
Figure 7:
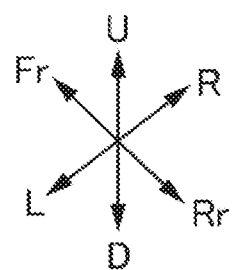

Here, the reinforcing member 11 will be specifically described with reference to FIG. 7.

The reinforcing member 11 includes a first reinforcing member 11A and a second reinforcing member 11B which have metallic properties. The first reinforcing member 11A includes a plate-like first plate portion 21, a second plate portion 22, and a third plate portion 23. The second plate portion 22 extends rightward from the rear end of the first plate portion 21 and the third plate portion 23 extends rightward from the front end of the first plate portion 21. The first fixed portion A1 extends rearward from the lower right end of the second plate portion 22 and the second fixed portion A2 extends forward from the lower end of the third plate portion 23. The second reinforcing member 11B includes a plate-like fourth plate portion 24 and the third fixed portion A3 extends leftward from the lower end of the fourth plate portion 24.

In the first reinforcing member 11A and the second reinforcing member 11B, the first plate portion 21 and the fourth plate portion 24 are joined by welding or the like. On the second reinforcing member 11B, ribs 25 and 26 for reinforcement are formed to extend from the fourth plate portion 24 to the third fixed portion A3.

Holes A1a, A2a, A3a, and A3b into which the bolts 18 are inserted are formed in the first fixed portion A1, the second fixed portion A2, and the third fixed portion A3.

On the other hand, in the upper surface 3u of the drive source 3, screw holes are formed at positions corresponding to the hole A1a and the hole A2a, and on the upper surface 7u of the control device 7, screw holes are formed at positions corresponding to the hole A3a and the hole A3b. Therefore, the bolts 18 are inserted into the hole A1a, hole A2a, hole A3a, and hole A3b and screwed into the screw holes formed in upper surface 3u of drive source 3 and upper surface 7u of control device 7, in such a manner that the drive source 3 and the control device 7 are connected via the reinforcing member 11.

Since the drive source 3 and the control device 7 are connected by the reinforcing member 11, the vibration of the control device 7 caused by the drive source 3 can be suppressed. Also, the reinforcing member 11 covers the front of the auxiliary machine 9 with the third plate portion 23, covers the left side of the auxiliary machine 9 with the first plate portion 21 and the fourth plate portion 24, and covers the rear of the auxiliary machine 9 with the second plate portion 22. Therefore, it is possible to prevent a tool from coming into contact with the auxiliary machine 9 at the time of assembling, maintenance, or the like, and to prevent another component from coming into contact at the time of assembling another component. Thus, by using the reinforcing member 11 as a protection member of the auxiliary machine 9, the auxiliary machine 9 can be protected while suppressing an increase in the number of parts.

Further, by fixing the reinforcing member 11 to the drive source 3 on the seismic source side at a plurality of locations, the vibration of the control device 7 can be more appropriately suppressed.

As illustrated in FIG. 4, when a line connecting the first fastening point B1 and the third fastening point B3 is set as a first virtual line L1 and a line connecting the second fastening point B2 and the fourth fastening point B4 is set as a second virtual line L2, the auxiliary machine 9 and the third fixed portion A3 are located in a region S interposed between the first virtual line L1 and the second virtual line L2 when viewed from above.

Thus, by arranging the auxiliary machine 9 and the third fixed portion A3 in the region S interposed between the first virtual line L1 and the second virtual line L2 in a top view, the torsional vibration of the control device 7 with respect to the drive source 3 can be effectively suppressed and the stress applied to the reinforcing member 11 can be suppressed by arranging the reinforcing member 11 at a position where the effect of the torsion is small.

In addition, when viewed from the above, the DC line connector 13 described above is located in the region S interposed between the first virtual line L1 and the second virtual line L2 and is disposed on the opposite side (distal side) of the drive source 3 with respect to a third virtual line L3 which is a line connecting the first fastening point B1 and the second fastening point B2. By arranging the DC line connector 13 on the side opposite to the drive source 3 on the vibration source side, vibration generated by the DC line connector 13 can be more appropriately suppressed.

In addition, as illustrated in FIG. 5, when viewed from the front-rear direction, the DC line connector 13 is disposed above the upper surface 5u of the transmission case 5 on which the control device 7 is mounted and below a fixing surface A0 between the control device 7 and the reinforcing member 11.

By arranging the DC line connector 13 of the control device 7 above the upper surface 5u of the transmission case 5 and below the fixing surface A0 between the control device 7 and the reinforcing member 11, vibration generated in the DC line connector 13 can be suppressed.

Further, when viewed from the above, the DC line connector 13 is disposed so as to overlap with a mount member 15 holding the drive unit 1 in the left-right direction as illustrated in FIG. 4. By arranging the DC line connector 13 so as to overlap with the mount member 15 as described above, vibration generated in the DC line connector 13 can be more appropriately suppressed.

As described above, the embodiment of the present invention has been described. However, the present is not limited to the embodiment described above and modifications, improvements, and the like can be made as appropriate.

For example, in the above embodiment, the reinforcing member 11 is composed of the first reinforcing member 11A and the second reinforcing member 11B which have metallic properties, but may be composed of one reinforcing member. Further, the reinforcing member 11 is not limited to a part of the auxiliary machine 9 and may be arranged so as to surround the entire circumference.

In addition, at least the following matters are described in this specification. In addition, although the corresponding components in the above-described embodiment are described in parentheses, the present invention is not limited to this.

(1) A drive unit (drive unit 1) which includes a drive source (drive source 3), a case (transmission case 5) which is connected to the drive source and accommodates an electric motor (electric motor 4), a control device (control device 7) which is mounted on an upper surface (upper surface 5u) of the case and controls the electric motor, and an auxiliary machine (auxiliary machine 9) placed on an upper surface (upper surface 3u) of the drive source, where
the drive source and the control device are connected by a reinforcing member (reinforcing member 11), and
the reinforcing member is arranged so as to surround at least a part of the auxiliary machine in a top view.

According to (1), since the drive source and the control device are connected by the reinforcing member, the vibration of the control device can be suppressed. Also, by disposing the reinforcing member so as to surround at least a part of the auxiliary machine, the reinforcing member can be used as a protection member of the auxiliary machine, and thus the number of parts can be reduced.

(2) The drive unit according to (1), where
in a top view, the reinforcing member is,
fixed to the upper surface of the drive source with a first fixed portion (first fixed portion A1) and a second fixed portion (second fixed portion A2) separated from each other in a direction (front-rear direction) orthogonal to an alignment direction (left-right direction) of the drive source and the control device, and
fixed to the control device with a third fixed portion (third fixed portion A3) located between the first fixed portion and the second fixed portion in the orthogonal direction.

According to (2), the vibration of the control device can be more appropriately suppressed by fixing the reinforcing member to the drive source on the vibration source side at a plurality of locations.

(3) The drive unit according to (2), where
the control device is fixed to the upper surface of the case at least at first to fourth fastening points (first fastening point B1 to fourth fastening point B4),
the first fastening point (first fastening point B1) and the second fastening point (second fastening point B2) are located distal to the drive source in the alignment direction,
the third fastening point (third fastening point B3) and the fourth fastening point (fourth fastening point B4) are located closer to the drive source in the alignment direction and closer to the auxiliary machine than the first fastening point and the second fastening point in the orthogonal direction,
the first fastening point and the third fastening point are located on one side (rear side) with respect to the auxiliary machine in the orthogonal direction,
the second fastening point and the fourth fastening point are located on the other side (front side) with respect to the auxiliary machine in the orthogonal direction, and
in a top view, the auxiliary machine and the third fixed portion are located in a region (region S) interposed between a first virtual line (first virtual line L1) connecting the first fastening point and the third fastening point and a second virtual line (second virtual line L2) connecting the second fastening point and the fourth fastening point.

According to (3), the torsional vibration of the control device with respect to the drive source can be effectively suppressed and the stress applied to the reinforcing member can be suppressed by arranging the reinforcing member at a position where the effect of the torsion is small.

(4) The drive unit according to (3), where
the control device is provided with a DC line connector (DC line connector 13) to which a DC line (DC line 40) connected to a battery is connected, and
in a top view, the DC line connector is located in the region, on an opposite side of the drive source with respect to a third virtual line (third virtual line L3) connecting the first fastening point and the second fastening point.

According to (4), since the DC line connector is arranged on the side opposite to the drive source on the vibration source side, the vibration generated by the DC line connector can be more appropriately suppressed.

(5) The drive unit according to any one of (2) to (4), where
the control device is provided with a DC line connector (DC line connector 13) to which a DC line (DC line 40) connected to a battery is connected, and
when seen from the orthogonal direction, the DC line connector is disposed above the upper surface of the case on which the control device is mounted and below a fixing surface (fixing surface A0) of the control device and the reinforcing member.

According to (5), by arranging the DC line connector of the control device above the upper surface of the case and below the fixing surface of the control device and the reinforcing member, vibrations generated in the DC line connector can be suppressed.

(6) The drive unit according to (5), where
the DC line connector is disposed so as to overlap a mount member (mount member 15) holding the drive unit in the alignment direction.

According to (6), by arranging the DC line connector so as to overlap with the mount member, vibration generated in the DC line connector can be more appropriately suppressed.

What is claimed is:

1. A drive unit comprising:
a drive source,
a case which is connected to the drive source and accommodates an electric motor,
a control device which is mounted on an upper surface of the case and controls the electric motor; and
an auxiliary machine placed on an upper surface of the drive source, wherein
the drive source and the control device are connected by a reinforcing member, and
the reinforcing member is arranged so as to surround at least a part of the auxiliary machine in a top view.

2. The drive unit according to claim 1, wherein
in a top view, the reinforcing member is,
fixed to the upper surface of the drive source with a first fixed portion and a second fixed portion separated from each other in a direction orthogonal to an alignment direction of the drive source and the control device, and fixed to the control device with a third fixed portion located between the first fixed portion and the second fixed portion in the orthogonal direction.

3. The drive unit according to claim 2, wherein the control device is fixed to the upper surface of the case at least at first to fourth fastening points, the first fastening point and the second fastening point are located distal to the drive source in the alignment direction, the third fastening point and the fourth fastening point are located closer to the drive source in the alignment direction and closer to the auxiliary machine than the first fastening point and the second fastening point in the orthogonal direction, the first fastening point and the third fastening point are located on one side with respect to the auxiliary machine in the orthogonal direction, the second fastening point and the fourth fastening point are located on the other side with respect to the auxiliary machine in the orthogonal direction, and in a top view, the auxiliary machine and the third fixed portion are located in a region interposed between a first virtual line connecting the first fastening point and the third fastening point and a second virtual line connecting the second fastening point and the fourth fastening point.

4. The drive unit according to claim 3, wherein the control device is provided with a DC line connector to which a DC line connected to a battery is connected, and in a top view, the DC line connector is located in the region, on an opposite side of the drive source with respect to a third virtual line connecting the first fastening point and the second fastening point.

5. The drive unit according to claim 2, wherein the control device is provided with a DC line connector to which a DC line connected to a battery is connected, and when seen from the orthogonal direction, the DC line connector is disposed above the upper surface of the case on which the control device is mounted and below a fixing surface of the control device and the reinforcing member.

6. The drive unit according to claim 5, wherein the DC line connector is disposed so as to overlap a mount member holding the drive unit in the alignment direction in a top view.

\* \* \* \* \*